(12) United States Patent
Furihata et al.

(10) Patent No.: US 7,537,211 B2
(45) Date of Patent: May 26, 2009

(54) MEDIA TRANSPORTATION MECHANISM AND A DATA PROCESSING APPARATUS HAVING A MEDIA TRANSPORTATION MECHANISM

(75) Inventors: Hideki Furihata, Okaya (JP); Norio Nagata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 755 days.

(21) Appl. No.: 11/128,877

(22) Filed: May 12, 2005

(65) Prior Publication Data
US 2005/0252975 A1   Nov. 17, 2005

(30) Foreign Application Priority Data
May 14, 2004   (JP)   .............................. 2004-144859

(51) Int. Cl.
B65H 9/16   (2006.01)
(52) U.S. Cl. .................. 271/251; 271/248; 399/395
(58) Field of Classification Search ................. 271/250, 271/251, 248; 347/104; 258/498, 496, 472, 258/296; 399/395; 400/579, 630
See application file for complete search history.

(56) References Cited

U.S. PATENT DOCUMENTS

| 4,432,541 A | * | 2/1984 | Clark et al. ................. 271/251 |
| 4,621,801 A |   | 11/1986 | Sanchez |
| 5,284,333 A |   | 2/1994 | Ishikawa |
| 5,683,078 A | * | 11/1997 | Schieck ...................... 271/250 |
| 6,324,377 B2 |  | 11/2001 | Ando et al. |
| 2001/0014235 A1 | | 8/2001 | Ando et al. |

FOREIGN PATENT DOCUMENTS

| JP | 58-139944 | 8/1983 |
| JP | 61-78155 | 5/1986 |
| JP | S62-113148 | 7/1987 |
| JP | 05-169743 | 7/1993 |
| JP | 5-77577 | 10/1993 |
| JP | 2000-233853 | 8/2000 |

OTHER PUBLICATIONS

Chinese Office Action dated Jan. 5, 2007 (and full English Translation).

* cited by examiner

*Primary Examiner*—Patrick H Mackey
*Assistant Examiner*—Michael C McCullough
(74) *Attorney, Agent, or Firm*—Edwards Angell Palmer & Dodge LLP; John J. Penny, Jr.; Brian R. Landry

(57) ABSTRACT

A media transportation mechanism comprising a first transportation roller pair and second transportation roller pair disposed in the transportation path on the upstream and downstream sides, respectively, of image scanners convey a slip over a sliding guide surface. The first transportation roller pair produces a feed force towards the sliding guide surface so as to push the leading end edge of the slip to the sliding guide surface. The second transportation roller pair produces a feed force in the direction away from the sliding guide surface so as to push the trailing end edge of the slip to the sliding guide surface.

13 Claims, 6 Drawing Sheets

MEDIA TRANSPORTATION MECHANISM AND A DATA PROCESSING APPARATUS HAVING A MEDIA TRANSPORTATION MECHANISM

BACKGROUND OF THE INVENTION

1. Field of Technology

The present invention relates to a media transportation mechanism for conveying slip media, and to a data processing apparatus comprising this media transportation mechanism.

2. Description of Related Art

Checks are widely used in Europe and North America for paying bills, making purchases, and fund transfers. Eventually the checks are delivered to a bank for depositing or cashing.

Numerous checks are therefore commonly processed in a short period of time at bank teller windows and other locations. The teller verifies each check, the date, and signature, then cashes or deposits the check, prints the bank endorsement, and issues a receipt as needed. The teller may also request a driver license or other form of personal identification to verify the identification of the person presenting the check, and may make a photocopy of the identification and/or copy the check itself using a scanner as needed. These copies must then also be stored. When check processing involves multiple banks, the check must conventionally also be physically delivered to each bank for processing.

Systems for electromagnetically reading and electronically processing checks have been developed to improve the efficiency of check processing. These systems include methods of electromagnetically reading and processing checks at the teller window, and transmitting digital images of the checks instead of delivering the physical checks for interbank check processing, using check processing machines that can be installed at each teller window.

Such compact check processing machines typically have a check transportation path for conveying the medium to be processed (a check in this example), a data reading unit disposed to the check transportation path for reading information from the check as the check passes thereby, a first transportation roller unit disposed in the transportation path upstream from the data reading unit for conveying the check to the data reading unit, and a second transportation roller unit disposed in the transportation path downstream from the data reading unit for conveying a check from the data reading unit yet further downstream.

The data reading unit is composed of a scanner having a contact image sensor (CIS) for imaging the check, and a magnetic ink character recognition reader (MICR) having a magnetic head for reading symbols printed in magnetic ink on the check.

To simplify loading and discharging checks in this check processing apparatus, the check transportation path may have a U-shaped configuration with both the supply (check loading) and discharge ends disposed at the front of the check processing apparatus.

The check transportation path may also be arranged to convey the checks in a vertical orientation, that is, standing on edge, in order to simplify removing paper jams and maintenance. In order to reduce device size, the first and second transportation roller units are also preferably arranged to grip the lower portion of the checks by means of a feed roller and a pressure roller when the checks are standing on edge.

To improve the reading accuracy of the data reading unit, the checks may also be pressed to the reading surface of the scanner and magnetic head by means of a pressure roller or pressure pad.

The rollers in the first and second transportation roller units are also cylindrical rollers with the roller shafts vertically oriented, and thus require precise assembly in order to convey the checks accurately along a horizontal path, that is, without skewing. However, because the transportation roller units are offset so that the portion gripping the check is disposed to the bottom part of the check, even a slight error in the installation precision can result in the checks being conveyed skewed to the transportation path, that is, skewing occurs easily. If a check is skewed to the transportation path, the image and symbols read by the scanner and magnetic head become distorted and may even move outside the readable range of the scanner or magnetic head. Skewing thus obviously leads to a drop in reading accuracy.

To overcome this problem, Japanese Unexamined Patent Appl. Pub. 2000-233853 teaches technology including a skew correction means separate from the first and second transportation roller units for correcting skew while the medium is being conveyed through the transportation path. This skew correction means has a plurality of bias rollers disposed at a specific angle to the transportation direction.

A problem with addressing this problem by using a bias roller device, that is, a component specifically for correcting skew, to the data reading unit is that the parts count obviously rises, leading to additional problems such as an increase in apparatus size and cost.

SUMMARY OF THE INVENTION

An object of one embodiment of the present invention is therefore to solve the foregoing problems by providing a media transportation mechanism that can prevent skewing of the check or other transported medium in the data reading unit without disposing a dedicated skew correction means (attitude control means) to the data reading unit, and can achieve a compact apparatus and cost savings by eliminating a dedicated attitude control means and thus simplifying the arrangement of the data reading unit. A further object of the invention is to provide a data processing apparatus having this media transportation mechanism.

To achieve the foregoing object, a media transportation mechanism according to one embodiment of the invention has a transportation path for transporting a medium; first and second transportation roller pairs respectively disposed in the transportation path on an upstream side and a downstream side of a device for acquiring information from or recording information to the medium; and a sliding guide surface disposed between the first transportation roller pair and second transportation roller pair for guiding the medium through the transportation path with the sliding guide surface in contact with one edge of the medium. The first transportation roller pair is structured to push a leading end edge of the medium against the sliding guide surface; and the second transportation roller pair is structured to push a trailing end portion of said edge of the medium against the sliding guide surface.

The upstream first transportation roller pair thus exerts a force pushing the edge at the leading end of the medium to the sliding guide surface, and the downstream second transportation roller pair exerts a force pushing the edge at the trailing end of the medium to the sliding guide surface. The medium can thus be conveyed without skew by means of a simple structure.

By preferably disposing the first and second transportation roller pairs with the rotational axes thereof biased to the transportation path (transportation direction), the leading end edge of the medium and the trailing end edge of the medium can be pushed to the sliding guide surface. More specifically, the rotational axis of the first transportation roller pair is inclined with the end farthest from the sliding guide surface angled in the forward transportation direction, and the rotational axis of the second transportation roller pair is inclined with the end closest to the sliding guide surface angled in the forward transportation direction.

Furthermore, in this embodiment, the first and second transportation roller pairs respectively have first and second feed rollers and first and second pressure rollers, and tapered rollers are used at least as the first and second feed rollers. As a result, the leading end edge of the medium and the trailing end edge of the medium can be pushed to the sliding guide surface.

In another aspect of the invention, the first and second transportation roller pairs respectively have first and second feed rollers and first and second pressure rollers, and arrangements of multiple rollers of different diameters are used for the first and second feed rollers. As a result, the leading end edge of the medium and the trailing end edge of the medium can be pushed to the sliding guide surface. Further preferably the roller shafts of the multiple rollers are connected by universal joints.

Another aspect of an embodiment of the present invention is a data processing apparatus having a media transportation mechanism as described herein.

A yet further aspect of an embodiment of the invention is a data processing apparatus having a transportation path for transporting a medium; a read head for reading information recorded on the medium; a first feed roller disposed near the upstream side of the read head; a second feed roller disposed near the downstream side of the read head; and a guide unit disposed at least between the first feed roller and second feed roller for guiding an edge of the medium travelling through the transportation path. The first and second feed rollers are structured to push the medium located between the first and second feed rollers to the guide unit.

Other objects and attainments together with a fuller understanding of the embodiments of the invention will become apparent and appreciated by referring to the following description and claims taken in conjunction with the accompanying drawings.

DESCRIPTION OF THE PREFERRED EMBODIMENTS

Preferred embodiments of a media transportation mechanism and data processing apparatus having a media transportation mechanism according to the present invention are described below with reference to the accompanying figures.

Figure 1:
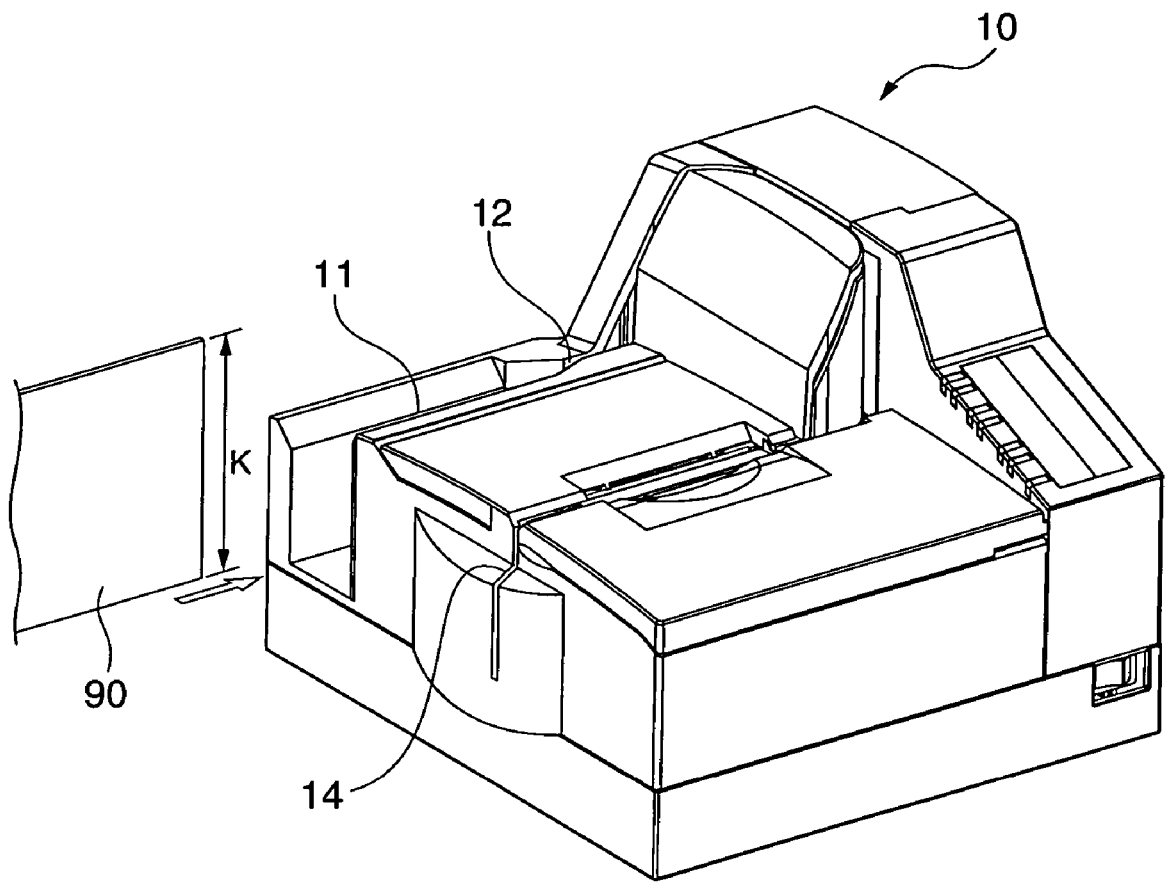
FIG. 1 is an external oblique view of a data processing apparatus using a media transportation mechanism according to a preferred embodiment of the present invention.

The data processing apparatus 10 shown in FIG. 1 is well-suited to use as a check processing apparatus having functions for reading magnetic ink character data and image information recorded on a slip 90 such as a check or other form. This data processing apparatus 10 comprises a paper supply unit 11 to which the slip 90 is inserted, a U-shaped transportation path 12 through which a slip 90 delivered from the paper supply unit 11 is conveyed, and an exit opening 14 from which the slip 90 is then discharged.

Figure 2B:
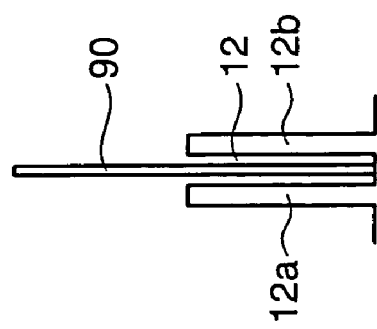
FIG. 2B is a section view through line I-I in FIG. 2A.
Figure 2A:
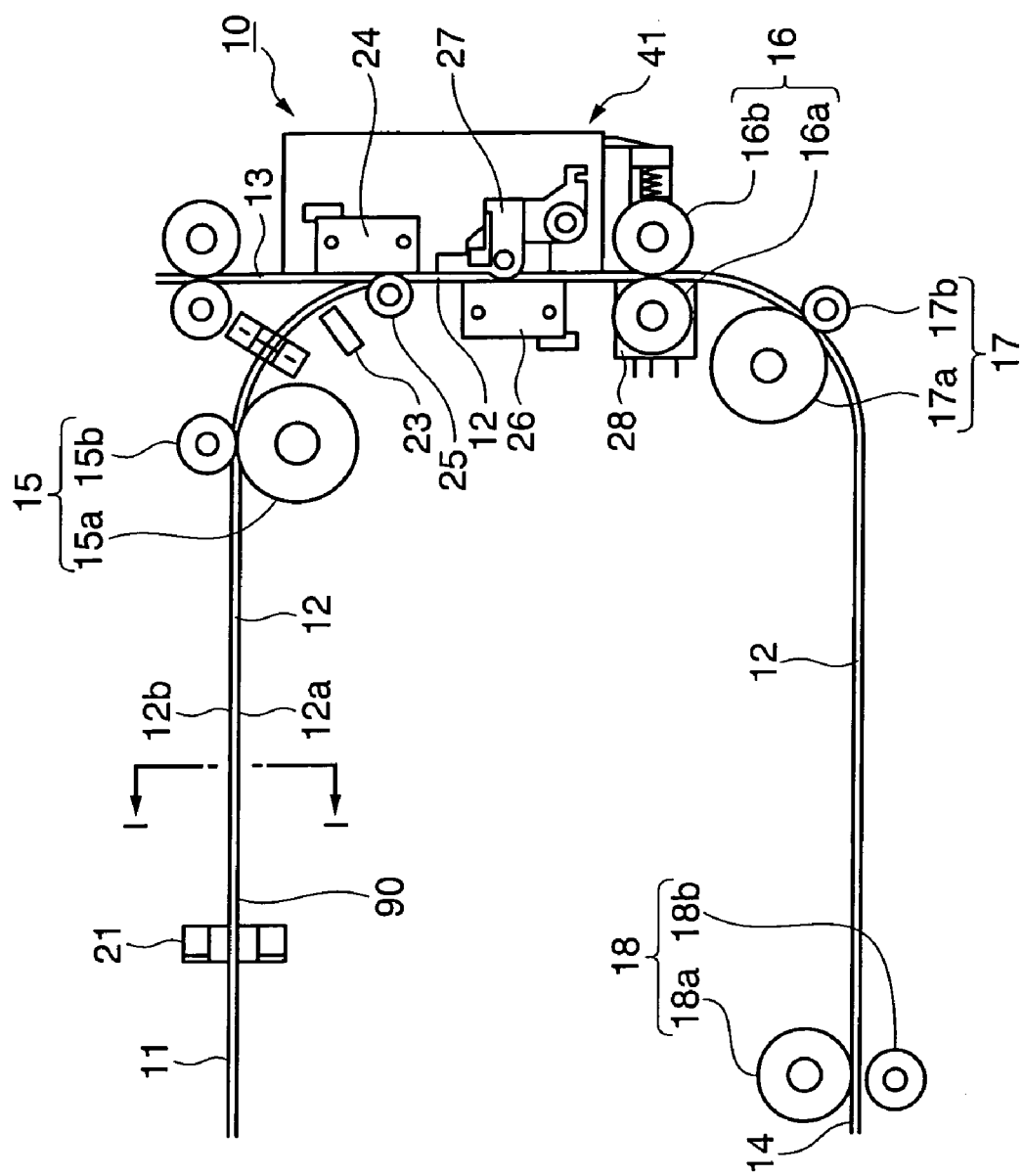
FIG. 2A is a schematic plan view showing the internal arrangement of the data processing apparatus.

In addition to this transportation path 12 for conveying easily pliable media such as checks and other paper slips 90, the data processing apparatus 10 also comprises a straight transportation path 13 as shown in FIG. 2A. This transportation path 13 is used for transporting relatively stiff media (not shown in the figure) such as driver licenses and identification cards made from materials that are not easily bent. The upper part of the straight portion between the two curved parts of the U-shaped transportation path 12 also functions as this straight transportation path 13.

Disposed along the transportation path 12 in order from the paper supply unit 11 are a paper detection sensor 21, first transportation roller pair 15, data reading unit 41, second transportation roller pair 17, and third transportation roller pair 18.

The data reading unit 41 comprises a magnet 23, two image scanners 24, 26 such as CIS devices, a pressure roller 25 and pressure device 27 for pressing the slip 90 to the image scanners 24, 26, transportation roller pair 16, a MICR head 28 disposed below the transportation roller pair 16, and a pressure pad not shown for pressing the slip 90 to the MICR head 28.

The first transportation roller pair 15 is disposed upstream from the data reading unit 41 for conveying the slip 90 to the data reading unit 41.

The second transportation roller pair 17 is disposed downstream from the data reading unit 41 for conveying the slip 90 from the data reading unit 41 to the third transportation roller pair 18 on the exit opening 14 side of the data reading unit 41.

The third transportation roller pair 18 is disposed near the exit opening 14 and discharges the slip 90 from the exit opening 14.

The two image scanners 24, 26 are disposed on opposite sides of the transportation path 12 so that one images a first side of the slip 90 and the other images the second side of the slip 90 (that is, the opposite side as the first side).

Note that for brevity only four transportation roller pairs 15 to 18 are shown in FIG. 2A, but feed rollers for delivering the slip 90 into the transportation path 12 could be disposed near the paper supply unit 11.

A data recording mechanism (such as a printing mechanism) may also be disposed in the transportation path 12 between the MICR head 28 and exit opening 14, for example, for writing (printing) information on the slip 90.

As shown in FIG. 2B, the transportation path 12 has two walls 12a and 12b for supporting the slip 90 on both sides so that the slip 90 is conveyed through the space between these two walls 12a and 12b.

The height of these walls 12a and 12b in the straight part of the transportation path 12 from the paper supply unit 11 to the first transportation roller pair 15 and in the straight part from the downstream side of the second transportation roller pair 17 to the exit opening 14 is low, specifically approximately half the height of the slip 90. This enables easily removing the slip 90 if a paper jam occurs.

When a slip 90 is inserted from the paper supply unit 11 to the transportation path 12 and the paper detection sensor 21 detects the slip 90, the resulting detection signal from the paper detection sensor 21 acts as a trigger causing the feed roller (not shown in the figure) and transportation roller pairs 15 to 18 to start operating. The image scanners 24, 26 and MICR head 28 also operate in sequence to image and read magnetic ink characters from the slip 90 travelling through the transportation path 12.

If the slip 90 is a check and has information recorded thereon in magnetic ink characters, the magnet 23 disposed downstream of the first transportation roller pair 15 magnetizes the magnetic ink characters for reading by the MICR head 28.

Each transportation roller pair 15 to 18 has a feed roller (drive roller) 15a to 18a and a pressure roller (driven roller) 15b to 18b. The feed rollers 15a to 18a are disposed on the inside of the transportation path 12 and are rotationally driven by a drive power source (motor) not shown. The pressure rollers 15b to 18b are disposed on the outside of the transportation path 12 and press the slip 90 to the opposing feed rollers 15a to 18a. The transportation roller pairs 15 to 18 each hold the slip 90 between the respective feed roller 15a to 18a and pressure roller 15b to 18b so that rotation of the feed roller 15a to 18a conveys the slip 90 in the transportation direction H (horizontally).

The image scanning operation of the image scanners 24, 26 is described next.

The first image scanner 24 is disposed to the outside wall 12b of the transportation path 12 with the scanning surface of the first image scanner 24 facing the transportation path 12. A pressure roller 25 for pressing the slip 90 to the scanning surface of the first image scanner 24 is disposed to the inside wall 12a of the transportation path 12 opposite the first image scanner 24.

The second image scanner 26 is disposed to the inside wall 12a downstream from the first image scanner 24 with the scanning surface of the second image scanner 26 facing the transportation path 12. A pressure device 27 for pressing the slip 90 to the scanning surface of the second image scanner 26 is disposed to the outside wall 12b of the transportation path 12 opposite the second image scanner 26.

As a result, when the slip 90 travelling through the transportation path 12 passes in front of the first image scanner 24, the first image scanner 24 images the side of the slip 90 facing the outside of the transportation path 12 (i.e., facing the first image scanner 24), and the second image scanner 26 images the side facing the inside when the slip 90 passes the second image scanner 26.

The height of the transportation path walls 12a and 12b is greater than the height K of the slip 90 between the first and second transportation roller pairs 15 and 17 (that is, in the image scanning area) disposed to the transportation path 12. As a result, the slip 90 is completely covered by the transportation path walls 12a and 12b and hidden within the transportation path 12 as the slip 90 passes through this imaging area.

Figure 3:
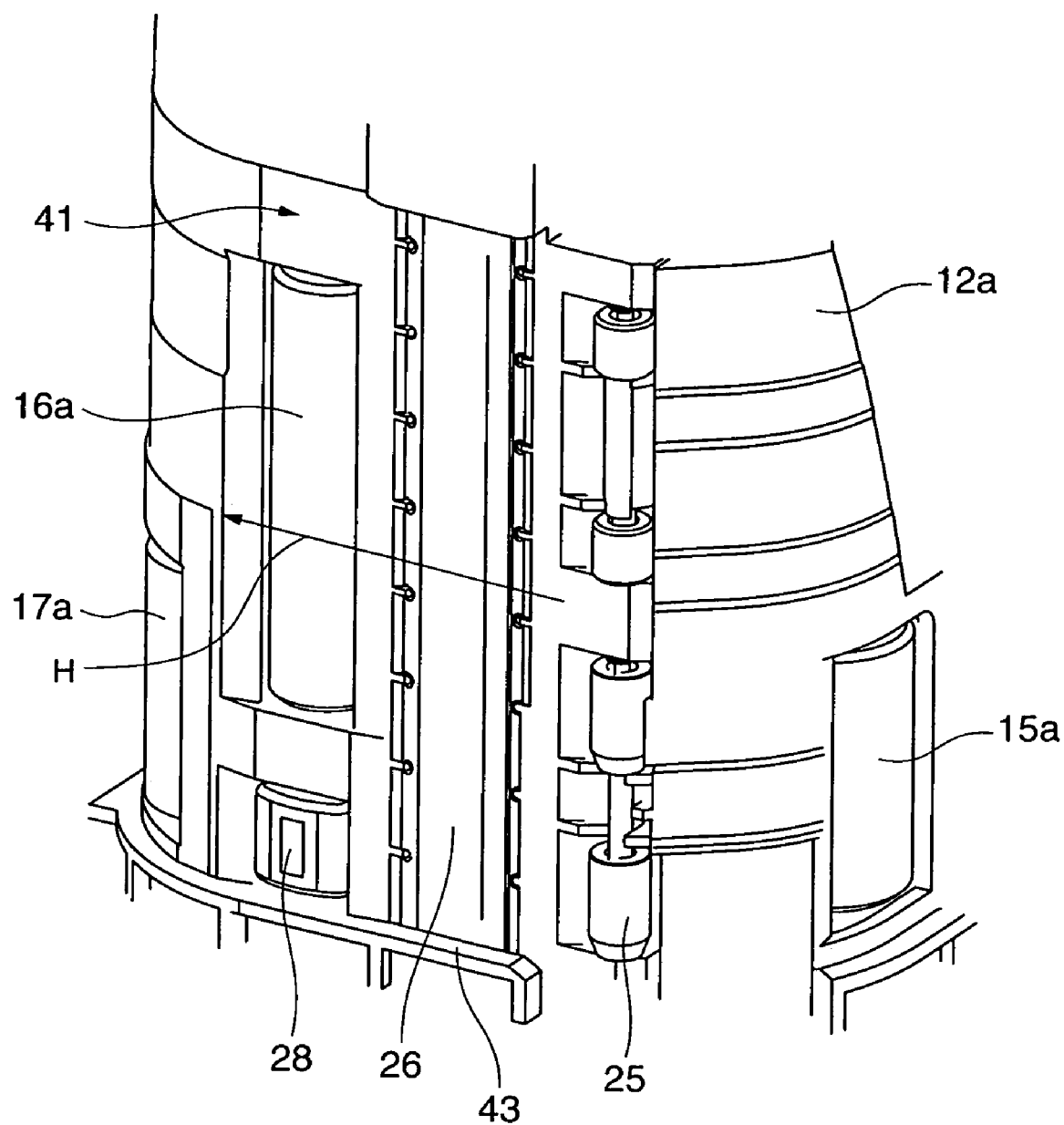
FIG. 3 is an oblique view showing the main parts of the media transportation mechanism.

FIG. 3 shows the arrangement of the feed roller 15a of the first transportation roller pair 15 disposed to the inside wall 12a, the pressure roller 25 of the first image scanner 24, the second image scanner 26, the MICR head 28, the feed roller 16a of transportation roller pair 16, and the feed roller 17a of the second transportation roller pair 17.

As shown in FIG. 3, a horizontal sliding guide surface 43, along which one edge (the bottom edge) of the slip 90 slides, extends in the transportation direction at the bottom of the inside wall 12a of the transportation path 12 in the imaging area.

Figure 4:
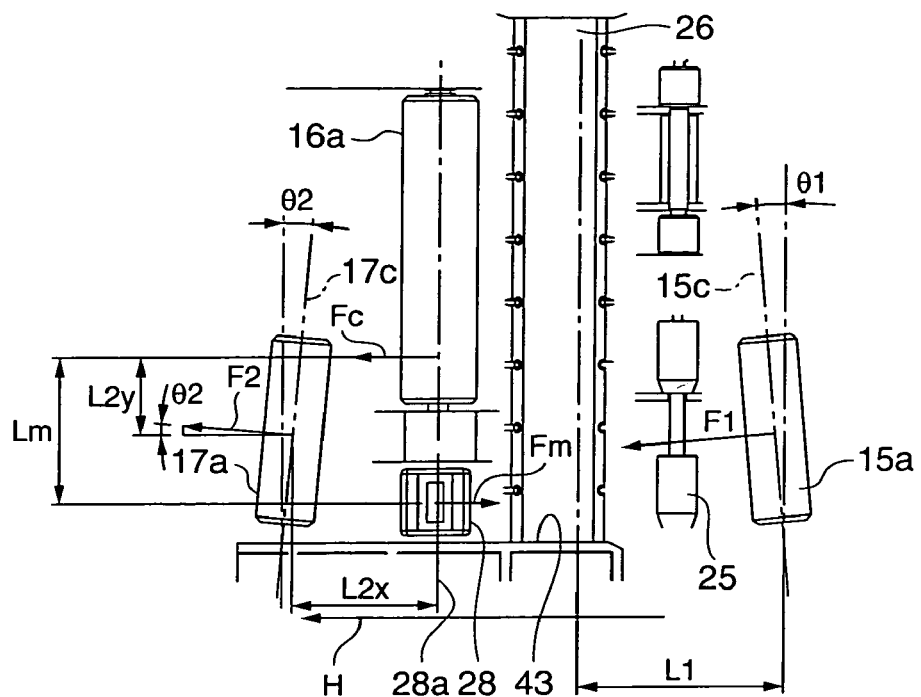
FIG. 4 describes the inclination of the roller axes of the transportation roller pairs in the media transportation mechanism.

As shown in FIG. 4, the first transportation roller pair 15 is disposed with the roller axis 15c tilted forward at an angle $\theta 1$ to the transportation direction H from the perpendicular to the sliding guide surface 43. The angle between the direction of the feed force F1 of the first transportation roller pair 15 and the perpendicular to the sliding guide surface 43 is thus not 90 degrees, and a component of the perpendicular to the sliding guide surface 43 is present in the feed force F1 of the first transportation roller pair 15.

As a result, one edge (the bottom edge) at the leading end of the conveyed slip 90 is pushed to the sliding guide surface 43 by this perpendicular component to the sliding guide surface 43 in the feed force F1 of the first transportation roller pair 15.

Note that "tilted forward" as used herein in reference to the first transportation roller pair 15 means that the top portion of the rollers is inclined in the forward transportation direction relative to the perpendicular to the sliding guide surface 43.

As also shown in FIG. 4, the second transportation roller pair 17 are disposed with the roller axis 17c thereof tilted backward at an angle $\theta 2$ from the perpendicular to the sliding guide surface 43, that is, in the opposite direction as the transportation direction. The angle between the direction of the feed force F2 of the second transportation roller pair 17 and the perpendicular to the sliding guide surface 43 is thus not 90 degrees, and a component of the perpendicular to the sliding guide surface 43 is present in the feed force F2 of the second transportation roller pair 17.

The slip 90 is thus conveyed with the leading end thereof urged upward by the perpendicular component of the sliding guide surface 43 in the feed force F2 of the second transportation roller pair 17, and one edge of the trailing end (the bottom edge) of the slip 90 is thus pushed to the sliding guide surface 43.

Note that "tilted backward" as used herein in reference to the second transportation roller pair 17 means that the top portion of the rollers is inclined in the opposite direction as the forward transportation direction relative to the perpendicular to the sliding guide surface 43.

The roller axes 15c, 17c of the first and second transportation roller pairs 15,17 disposed with the first and second image scanners 24, 26 therebetween are thus disposed inclined forward or backward to the perpendicular to the sliding guide surface 43 and thus consistently urge the slip 90 to the sliding guide surface 43 while conveying the slip 90 along the sliding guide surface 43. As a result, the slip 90 is prevented from skewing while any part of the slip 90 is held between the first and second transportation roller pairs 15,17.

The bias angle $\theta 1$ of the roller axis 15c is preferably set to satisfy the following equation (1) in order to prevent skewing by correcting the rise x in the leading end of the slip 90 before the slip 90 reaches the position where imaging starts.

$$\theta1=\tan^{-1}(x/L1) \quad (1)$$

where x is the rise (lift) in the leading end of the slip 90 from the sliding guide surface 43 expected when only the first transportation roller pair 15 conveys the slip 90 horizontally, and L1 is the horizontal distance (length in the transportation direction) from the horizontal position of the roller axis 15c (the intersection of lines through the roller axis and the sliding guide surface) to the reading position 24a of the first image scanner 24.

By thus defining θ1, the slip 90 is guided parallel to the paper transportation direction by the sliding guide surface 43 when the leading end of the slip 90 reaches the first image scanner 24.

Furthermore, the slip 90 can be expected to slip against the feed roller 16a when the slip 90 is conveyed by only the second transportation roller pair 17. This slipping of the form 90 can be eliminated and skewing can thus be prevented by controlling the bias angle θ2 of the roller axis 17c to the range defined by equation (2).

$$L2x*F2\sin\theta2+L2y*F2\cos\theta2=Lm*Fm \quad (2)$$

where L2x is the horizontal distance from the center of the roller axis 17c of the second transportation roller pair 17 to the scanning position 28a of the MICR head 28, Lm is the vertical distance from the working point Fc of the feed roller 16a to the MICR head 28, L2y is the vertical distance from the working point Fc of the feed roller 16a to rollers 17a and 17b, and Fm is the force of friction asserted on the slip 90 by a pressure pad (not shown in the figure) for pressing the slip 90 to the MICR head 28.

Note that working point Fc is determined by the relationship between the feed roller 16a and pressure roller 16b, and is located in this embodiment as shown in FIG. 4.

Figure 5:
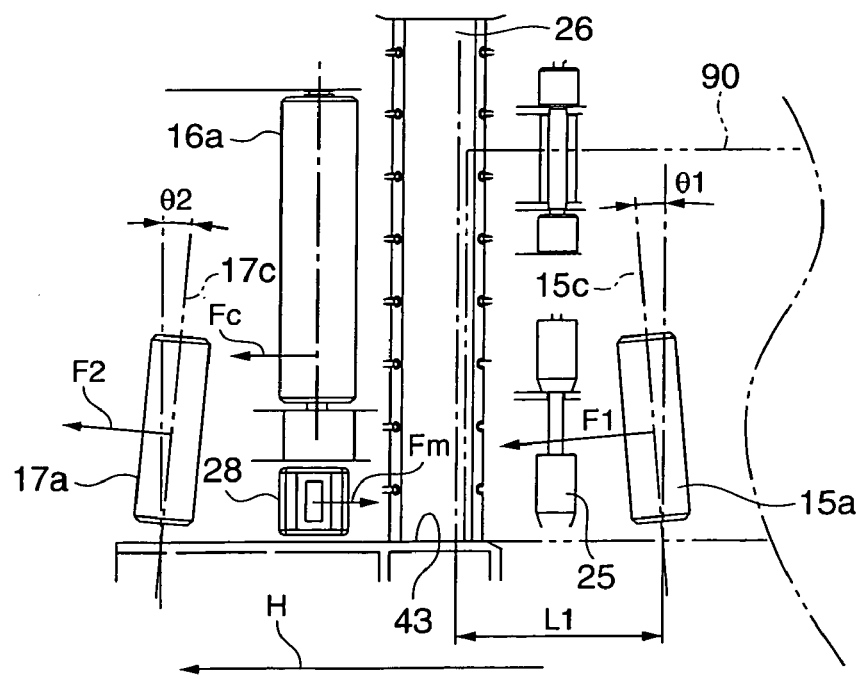
FIG. 5 describes form transportation when the leading end of the medium is fed to the first transportation roller pair of the media transportation mechanism and the medium is conveyed by only the first transportation roller pair.

As described above, the first transportation roller pair 15 of the media transportation mechanism in a data processing apparatus 10 according to an embodiment of the present invention produces a feed force F1 biased towards the sliding guide surface 43 as shown in FIG. 5. When the leading end in the transportation direction of the slip 90 reaches the first transportation roller pair 15, this feed force F1 pushes the side edge (bottom edge) at the leading end of the slip 90 to enter the data reading unit 41 at a forward inclination reliably in contact with the sliding guide surface 43. As a result, the area of this side edge in contact with the sliding guide surface 43 steadily increases as the slip 90 advances, and the slip 90 is thus conveyed parallel to the sliding guide surface 43. The media transportation mechanism of the present invention can thus feed a slip 90 into the data reading unit 41 without skewing.

Figure 6:
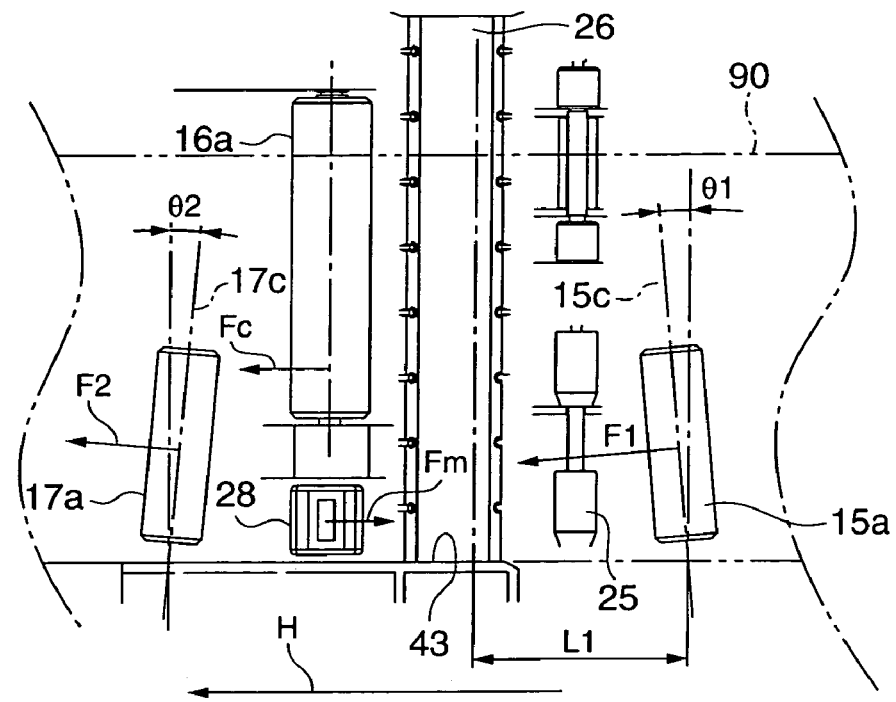
FIG. 6 describes form transportation when the medium is held by both the first transportation roller pair and second transportation roller pair of the media transportation mechanism and is conveyed by cooperative operation of the transportation roller pairs.

The first transportation roller pair 15 then continues conveying the slip 90 forward through the data reading unit 41 and the leading end reaches the second transportation roller pair 17. The slip 90 is then conveyed by the force of both the first transportation roller pair 15 and second transportation roller pair 17 as shown in FIG. 6.

As also described above, the second transportation roller pair 17 produces a feed force F2 biased in the direction moving away from the sliding guide surface 43, and is thus inclined backwards in the transportation direction. When the leading end of the slip 90 reaches the second transportation roller pair 17, this feed force F2 therefore urges the side edge (bottom edge) at the trailing end reliably against the sliding guide surface 43.

Figure 7:
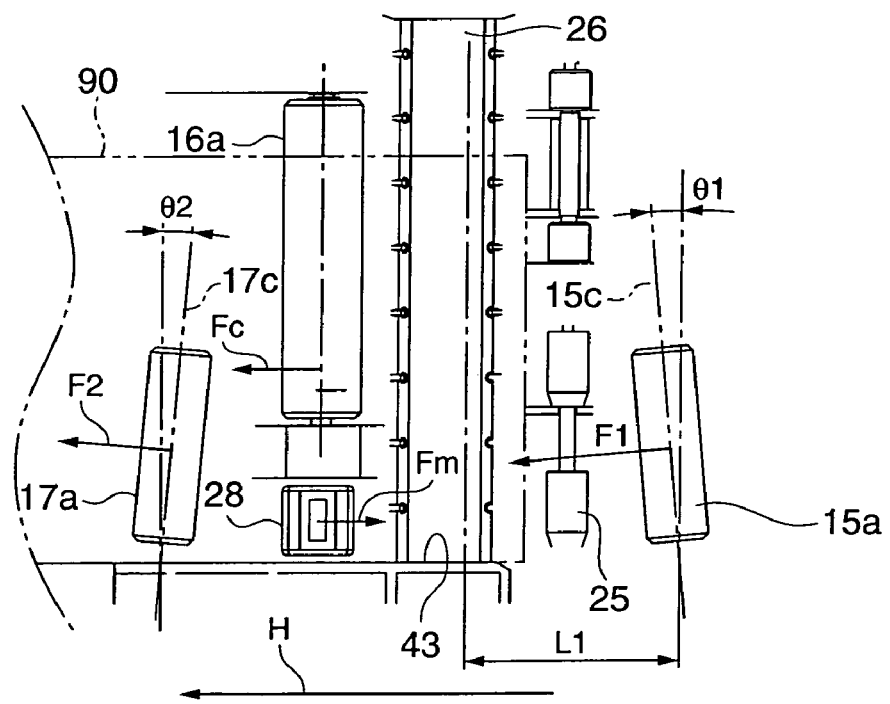
FIG. 7 describes form transportation when the trailing end of the medium is released from the first transportation roller pair of the media transportation mechanism and the medium is conveyed by only the second transportation roller pair.

As the slip 90 is thus conveyed further forward so that the trailing end of the slip 90 is released from the feed force of the first transportation roller pair 15 and the slip 90 is conveyed only by the second transportation roller pair 17 as shown in FIG. 7, this feed force F2 of the second transportation roller pair 17 prevents the trailing end of the slip 90 from separating from the sliding guide surface 43. As a result, the slip 90 is conveyed as before with the side edge moving in contact with the sliding guide surface 43, and the slip 90 is thus held and conveyed in a desirable attitude without skewing until the slip 90 passes completely through the area of the data reading unit 41.

The media transportation mechanism of an embodiment of the present invention can thus desirably convey a medium without skewing using only a first transportation roller pair 15 and second transportation roller pair 17 disposed on opposite sides of the data reading unit 41.

The present invention thus provides a media transportation mechanism that can prevent skewing of the check or other transported medium 90 passed the data reading unit 41 without disposing a dedicated skew correction means to the data reading unit 41, and affords a compact apparatus and cost savings by eliminating a dedicated skew correction means and thus simplifying the arrangement of the data reading unit 41.

The arrangement enabling the first transportation roller pair 15 and second transportation roller pair 17 to produce feed forces F1 and F2 biased at a specific angle to the sliding guide surface 43 shall not be limited to an arrangement inclining the roller axes as described in the foregoing embodiment.

Figure 8A:
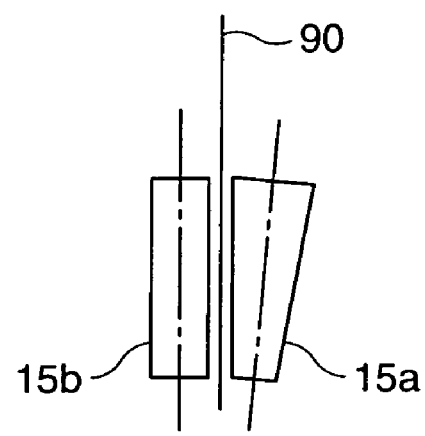
FIGS. 8A and 8B describe alternative arrangements of the first transportation roller pair of the media transportation mechanism.

As shown in FIG. 8A, for example, the roller axes could be perpendicular to the transportation direction of the slip 90 while the feed rollers 15a and 17a are tapered rollers with a tapered outside surface. In this type of arrangement, the feed roller 15a is disposed with the large diameter end of the tapered roller at the top and the small diameter end at the bottom, and the other feed roller 17a is disposed with the large diameter end on the bottom and the small diameter end at the top (although not shown in the figure). In addition to the feed rollers 15a and 17a, tapered rollers could also be used for the pressure rollers 15b and 17b.

Figure 8B:
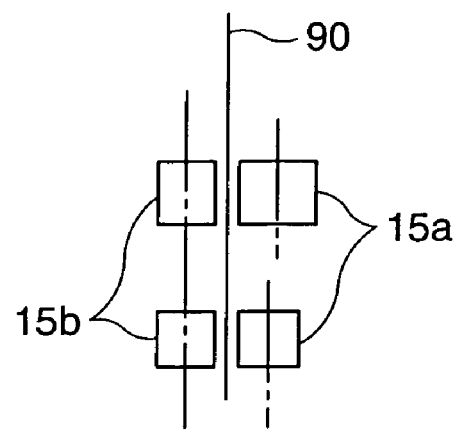

Further alternatively as shown in FIG. 8B, the roller axes could be arranged perpendicularly to the transportation direction of the slip 90, and a plurality of feed rollers of different diameters could be arrayed on this perpendicular axis. Drive power can also be relayed using a simple arrangement in this situation by connecting the roller shafts of these multiple feed rollers using universal joints. In this arrangement the diameter of the top feed roller 15a in the first transportation roller pair 15 is larger than the diameter of the bottom feed roller 15a, and though not shown in the figures, the diameter of the bottom feed roller 17a in the second transportation roller pair 17 is larger than the diameter of the top feed roller 17a.

The media transportation mechanism of the present invention is described herein using by way of example an arrangement in which the slip 90 is held standing vertically on edge. The invention shall not be so limited, however, and this invention can also be applied to structures for conveying the slip 90 horizontally.

The media transportation mechanism of the present invention is also not limited to use in a check processing apparatus, and can be used in paper transportation mechanisms used in printers, photocopiers, and other document handling devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media transportation mechanism comprising:
a transportation path for transporting a medium;
first and second transportation roller pairs respectively disposed on the transportation path on an upstream side and a downstream side of a device for acquiring information from or recording information to the medium, each transportation roller having a rotational axis; and
a sliding guide surface disposed between the first transportation roller pair and second transportation roller pair for guiding the medium through the transportation path with the sliding guide surface in contact with one edge of the medium;
wherein the first transportation roller pair is structured to push one leading end edge of the medium against the sliding guide surface;
the second transportation roller pair is structured to push a trailing end portion of said edge of the medium against the sliding guide surface;
the first and second transportation roller pairs are disposed with the rotational axes thereof biased relative to the transportation path;
the rotational axis of the first transportation roller pair being inclined with an end farthest from the sliding guide surface disposed forward of an end closest to the sliding guide surface in a forward transportation direction; and
the rotational axis of the second transportation roller pair being inclined with an end closest to the sliding guide surface disposed forward of an end farthest from the sliding guide surface angled in the forward transportation direction.

2. The media transportation mechanism of claim 1, wherein:
the first transportation roller pair comprises a first feed roller and a first pressure roller with at least the first feed roller being a tapered roller having a small diameter end and a large diameter end; and the second transportation roller pair comprises a second feed roller and a second pressure roller with at least the second feed roller being a tapered roller having a small diameter end and a large diameter end.

3. The media transportation mechanism of claim 2, wherein said small diameter of said first feed roller is arranged closer to the sliding guide surface than said large diameter of said first feed roller, and said large diameter of said second feed roller is arranged closer to the sliding guide surface than said small diameter of said second feed roller.

4. The media transportation mechanism of claim 1, wherein:
the first transportation roller pair comprises a first feed roller and a first pressure roller with the first feed roller being an arrangement of multiple rollers of different diameter; and
the second transportation roller pair comprises a second feed roller and a second pressure roller with at least the second feed roller being an arrangement of multiple rollers of different diameters.

5. The media transportation mechanism of claim 1, wherein the rotational axis of said first transportation roller pair is approximately equal to $\tan^{-1}(x/L1)$, wherein x is a rise in a leading end of the medium from the sliding guide surface expected when only the first transportation roller pair conveys the medium, and L1 is a length from the horizontal position of the rotational axis of the first roller axis (the intersection of lines through the roller axis and the sliding guide surface) to a reading position of the device.

6. The media transportation mechanism of claim 1, wherein said transportation path has two walls for supporting said medium, wherein a height of said walls upstream of said first transportation roller pair and downstream of said second transportation roller pair is approximately half of a height of said medium.

7. The media transportation mechanism of claim 1, wherein said transportation path has two walls for supporting said medium, wherein a height of said walls between said first transportation roller pair and said second transportation roller pair is greater than a height of said medium.

8. A media transportation mechanism comprising:
first and second transportation means respectively disposed in a transportation path on an upstream side and a downstream side of a means for acquiring information from or recording information to the medium, each transportation means having a rotational axis; and
a guide means for guiding the medium through the transportation path between the first transportation means and the second transportation means;
wherein the first transportation means transports the medium to push one leading end edge of the medium against the guide means;
the second transportation means transports the medium to push a trailing end portion of said edge of the medium against the guide means;
the first and second transportation means are disposed with the rotational axes thereof biased relative to the transportation path;
the rotational axis of the first transportation means being inclined with an end farthest from the guide means disposed forward of an end closest to the guide means in a forward transportation direction; and
the rotational axis of the second transportation means being inclined with an end closest to the guide means disposed forward of an end farthest from the guide means in the forward transportation direction.

9. The media transportation mechanism of claim 8, wherein:
the first transportation means comprises a first feed roller and a first pressure roller with at least the first feed roller being a tapered roller having a small diameter end and a large diameter end; and
the second transportation means comprises a second feed roller and a second pressure roller with at least the second feed roller being a tapered roller having a small diameter end and a large diameter end.

10. The media transportation mechanism of claim 9, wherein said small diameter of said first feed roller is arranged closer to the sliding guide surface than said large diameter of said first feed roller, and said large diameter of said second feed roller is arranged closer to the sliding guide surface than said small diameter of said second feed roller.

11. The media transportation mechanism of claim 8, wherein:
the first transportation means comprises a first feed roller and a first pressure roller with the first feed roller being an arrangement of multiple rollers of different diameters; and
the second transportation means comprises a second feed roller and a second pressure roller with at least the second feed roller being an arrangement of multiple rollers of different diameters.

12. A data processing apparatus comprising a media transportation mechanism of any one of claims 1, 2, 4, 8, 9, or 11.

13. A data processing apparatus comprising:
a transportation path for transporting a medium;
a read head for reading information recorded on the medium;
a first feed roller disposed near the upstream side of the read head;
a second feed roller disposed near the downstream side of the read head; and
a guide unit disposed at least between the first feed roller and second feed roller for guiding an edge of the medium travelling through the transportation path;
wherein the first and second feed rollers are structured to push the medium located between the first and second feed rollers to the guide unit;
each feed roller has a rotational axis;
the first and second feed rollers are disposed with the rotational axes thereof biased relative to the transportation path;
the rotational axis of the first feed roller being inclined with an end farthest from the guide unit disposed forward of an end closest to the guide unit in a forward transportation direction; and
the rotational axis of the second feed roller being inclined with an end closest to the guide unit disposed forward of an end farthest from the guide unit angled in the forward transportation direction.

* * * * *